(12) United States Patent
Huang et al.

(10) Patent No.: US 8,595,504 B2
(45) Date of Patent: Nov. 26, 2013

(54) LIGHT WEIGHT AUTHENTICATION AND SECRET RETRIEVAL

(75) Inventors: Shih-I Huang, Hsinchu (TW);
Shiuh-Pyng Shieh, Hsinchu (TW);
Sheng-Ming Chang, Hsinchu (TW);
Chi-Wei Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1154 days.

(21) Appl. No.: 12/190,238

(22) Filed: Aug. 12, 2008

(65) Prior Publication Data

US 2010/0042842 A1     Feb. 18, 2010

(51) Int. Cl.
*H04L 9/00* (2006.01)

(52) U.S. Cl.
USPC ............ 713/176; 713/170; 713/177; 713/180

(58) Field of Classification Search
USPC .............. 713/161, 168, 170, 176, 180; 726/2; 380/229
See application file for complete search history.

(56) References Cited

U.S. PATENT DOCUMENTS

| | | | |
|---|---|---|---|
| 4,309,569 A * | 1/1982 | Merkle | 713/177 |
| 5,949,335 A | 9/1999 | Maynard | |
| 6,185,680 B1 | 2/2001 | Shimbo et al. | |
| 6,446,206 B1 * | 9/2002 | Feldbaum | 713/175 |
| 6,972,682 B2 | 12/2005 | Lareau et al. | |
| 7,158,637 B2 | 1/2007 | Ohta et al. | |
| 7,159,119 B2 | 1/2007 | Wilson et al. | |
| 7,213,149 B2 | 5/2007 | Mache | |
| 7,218,917 B2 | 5/2007 | Pradhan et al. | |
| 2001/0034839 A1 * | 10/2001 | Karjoth et al. | 713/190 |
| 2002/0147920 A1 * | 10/2002 | Mauro | 713/200 |
| 2002/0184504 A1 * | 12/2002 | Hughes | 713/177 |
| 2003/0044017 A1 * | 3/2003 | Briscoe | 380/277 |
| 2005/0091545 A1 * | 4/2005 | Soppera | 713/202 |
| 2007/0189542 A1 * | 8/2007 | Alldredge | 380/283 |
| 2010/0005310 A1 * | 1/2010 | Gentry et al. | 713/176 |
| 2010/0122089 A1 * | 5/2010 | Godfrey et al. | 713/168 |

FOREIGN PATENT DOCUMENTS

| | | |
|---|---|---|
| TW | 00569570 | 1/2004 |
| TW | I283524 | 10/2005 |
| TW | I253252 | 4/2006 |

OTHER PUBLICATIONS

Gennaro, R. et al. How to Sign Digital Stream, 1997, Springer-Veriag, pp. 180-197.*
Wong, C. et al. Digital Signatures for Flows and Multicases, Aug. 99, IEEE/ACM, pp. 502-513.*

\* cited by examiner

*Primary Examiner* — Zachary A Davis
*Assistant Examiner* — Joseph Pan
(74) *Attorney, Agent, or Firm* — Finnegan, Henderson, Farabow, Garrett & Dunner, LLP

(57) ABSTRACT

A method for authenticating a message in a network is provided. The method includes a step of generating, in a sink device, a private key and a public key. The private key includes a plurality of sub-private keys. The method further includes a step of generating, in the sink device, a signature for the message. The signature includes a sub-private key and an authentication path associated with the sub-private key in a hash tree. The hash tree is constructed during the generation of the sub-public keys.

23 Claims, 12 Drawing Sheets

LIGHT WEIGHT AUTHENTICATION AND SECRET RETRIEVAL

FIELD OF THE INVENTION

This invention in general relates to a sensor network system and methods for message transmission in the system. More specifically, this invention relates to a wireless sensor network system and methods for authenticating and transmitting messages in the wireless sensor network system.

BACKGROUND

Wireless sensor networks (WSN) are an emerging sensing system for communication. In a WSN, a plurality of sensor nodes are arranged in a discrete manner within a certain space for sensing other wireless devices, for example, a tag node or an identification node. Information can be transmitted between two sensors nodes, or from a sensor node to a tag node or an identification node, and vice versa.

A WSN can be used in a variety of applications, for example, in healthcare, home, military, or inventory management systems. A tag node in a WSN may save certain information associated with a target. For example, a tag node associated with a book may save basic information regarding the book including title, author, publisher, series number, et al. A tag node is usually placed in the neighborhood of its target or even attached to the target. Tag nodes may be moved with its target under certain circumstances. If a WSN system includes a large quantity of targets, the system would also use a large number of corresponding tag nodes. Therefore, tag nodes should be light weight, easy to use, and low cost. In view of these constraints, a tag node usually does not have an embedded power supply like a battery. Oftentimes, a tag node is equipped with an antenna to induce weak electric current and can only perform primitive operations.

Depending on the application, tag nodes may encompass sensitive and personal information. For example, in a medical WSN, a tag node may store personal data including name, social security number, blood type, symptoms, and chronological prescriptions of a person. This data should be well protected against unauthorized entities obtaining the data. Since the private data would be stored in the tag nodes and transmitted over an open WSN, the tag nodes that store the data should be able to reject unauthorized requests for retrieving the data, and the data should be kept in an encrypted manner during transmission.

Due to generally low power supplied to tag nodes, tag nodes may be computationally weak. Therefore conventional security mechanisms such as RSA asymmetric cryptosystem or AES encryption algorithm, both systems requiring tag nodes of high computation capability, are generally not applied to a WSN having weak tag nodes.

A conventional data retrieval scheme in a WSN is shown in FIG. 9. A sink node, which may be a server for a user to input certain information, sends out a query for certain data. The query may be encrypted in order to protect the query from exposure to attackers. A tag node may need to decrypt the query upon receipt. The tag node further decrypts stored data and performs searching over the data to find the correct response to the query. After finding the response, the tag node may encrypt the response in order to send it over the WSN. In addition, tag nodes with low-cost and simple design are vulnerable to physical attacks. The tag nodes should encrypt all of the data which was decrypted during the searching stage. Large computation power is involved during this data retrieval process. It is infeasible for a tag node having weak electrical current to perform such heavy computation.

To deal with these problems, the present invention proposes light-weight authentication and secret retrieval methods for communication systems.

SUMMARY

Consistent with embodiments of the present invention, a method for authenticating a message in a network is provided. The method includes a step of generating, in a sink device, a private key and a public key. The private key includes a plurality of sub-private keys. The method further includes a step of generating, in the sink device, a signature for the message. The signature includes a sub-private key and an authentication path associated with the sub-private key in a hash tree. The hash tree is constructed during the generation of the sub-public keys.

Consistent with embodiments of the present invention, a method for a tag device to verify a message from a sink device is provided. The sink device has a computation capability greater than the tag device. The method includes a step of generating, in the sink device, a private key and a public key. The private key includes a plurality of sub-private keys and the public key includes a plurality of sub-public keys. The sub-private keys are generated by a pseudorandom generator. The method further includes: storing in the sink device the private key; generating in the sink device a signature for the message; transmitting the public key, the message, and the signature from the sink device to the tag device. The signature includes a sub-private key and an authentication path associated with the sub-private key in a hash tree. The hash tree is constructed during the generation of the sub-public keys.

Consistent with embodiments of the present invention, a method for uploading a message from a sink device into a tag device is provided. The sink device has a computation capability greater than the tag device. The method includes: generating in the sink device a private key, wherein the private key comprises a plurality of sub-private keys; hashing the sub-private keys; generating a public key by constructing a plurality of hash trees using the hashed sub-private keys as leaf nodes; encrypting the message; generating a signature for the encrypted message in the sink device by selecting a sub-private key and an authentication path in a hash tree, the hash tree being constructed during the generation of the public key; and transmitting the message and the signature to the tag device.

Consistent with embodiments of the present invention, a method for a sink device to search an encrypted message stored in a tag device without decryption of the encrypted message is provided. The sink device has a computation capability greater than the tag device. The method includes: hashing in the sink device a message to be a first hash value; hashing in the sink device a secret, which is shared between the sink device and the tag device, to be a second hash value; hashing in the sink device an index message associated with the message to be a third hash value; encrypting in the sink device the message by an operation of exclusive disjunction over the message, the first hash value, and the second hash value, and encrypting the index message by an operation of exclusive disjunction over the index message, the second hash value, and the third hash value; generating in the sink device a first signature for the encrypted message and the encrypted index message; and storing in the tag device the encrypted message and the encrypted index message.

Consistent with embodiments of the present invention, a system is provided. The system includes a sink device and a tag device. The sink device includes a memory for storing instructions and data; and a processor coupled to the memory. The processor is operable to execute instructions stored in the memory for: generating a private key and a public key, wherein the private key comprises a plurality of sub-private keys; generating a signature for a message; and transmitting the public key, the message, and the signature from the sink device to the tag device. The signature includes a sub-private key and an authentication path associated with the sub-private key in a hash tree. The hash tree is constructed during the generation of the sub-public keys.

Consistent with embodiments of the present invention, a system for uploading a message from a sink device into a tag device is provided. The system includes a sink device including: a memory for storing instructions and data; and a processor coupled to the memory. The processor is operable to execute instructions stored in the memory for: generating a private key which includes a plurality of sub-private keys; hashing the sub-private keys; generating a public key by constructing a plurality of hash trees using the hashed sub-private keys as leaf nodes; encrypting the message into an encrypted message; generating a signature for the encrypted message by selecting a sub-private key and an authentication path associated with the sub-private key in a hash tree; and transmitting the encrypted message and the signature to the tag device. The hash tree is constructed during the generation of the public key.

Consistent with embodiments of the present invention, a system for searching an encrypted message within a network without decryption of the encrypted message is provided. The system includes a sink device and a tag device. The sink device includes a first memory for storing instructions and data, and a first processor coupled to the first memory. The first processor is operable to execute instructions stored in the first memory for: hashing a message to be a first hash value; hashing a secret to be a second hash value, the secret being shared between the sink device and the tag device; hashing an index message associated with the message to be a third hash value; encrypting the message by an operation of exclusive disjunction over the message, the first hash value, and the second hash value, and encrypting the index message by an operation of exclusive disjunction over the index message, the second hash value, and the third hash value; generating a first signature for the encrypted message and the encrypted index message; transmitting the encrypted message, the encrypted index message, and the first signature to the tag device; generating a search message by an operation of exclusive disjunction over the index message and the third hash value; generating a second signature for the search message in the sink device; and transmitting the search message and the second signature to the tag node.

BRIEF DESCRIPTION OF THE DRAWINGS

The accompanying drawings, which are incorporated in and constitute a part of this specification, illustrate embodiments of the invention and, together with the description, serve to explain features, advantages, and principles of the invention.

In the drawings.

DESCRIPTION OF THE EMBODIMENTS

Reference will now be made in detail to the present embodiments of the invention, examples of which are illustrated in the accompanying drawings.

Figure 1:
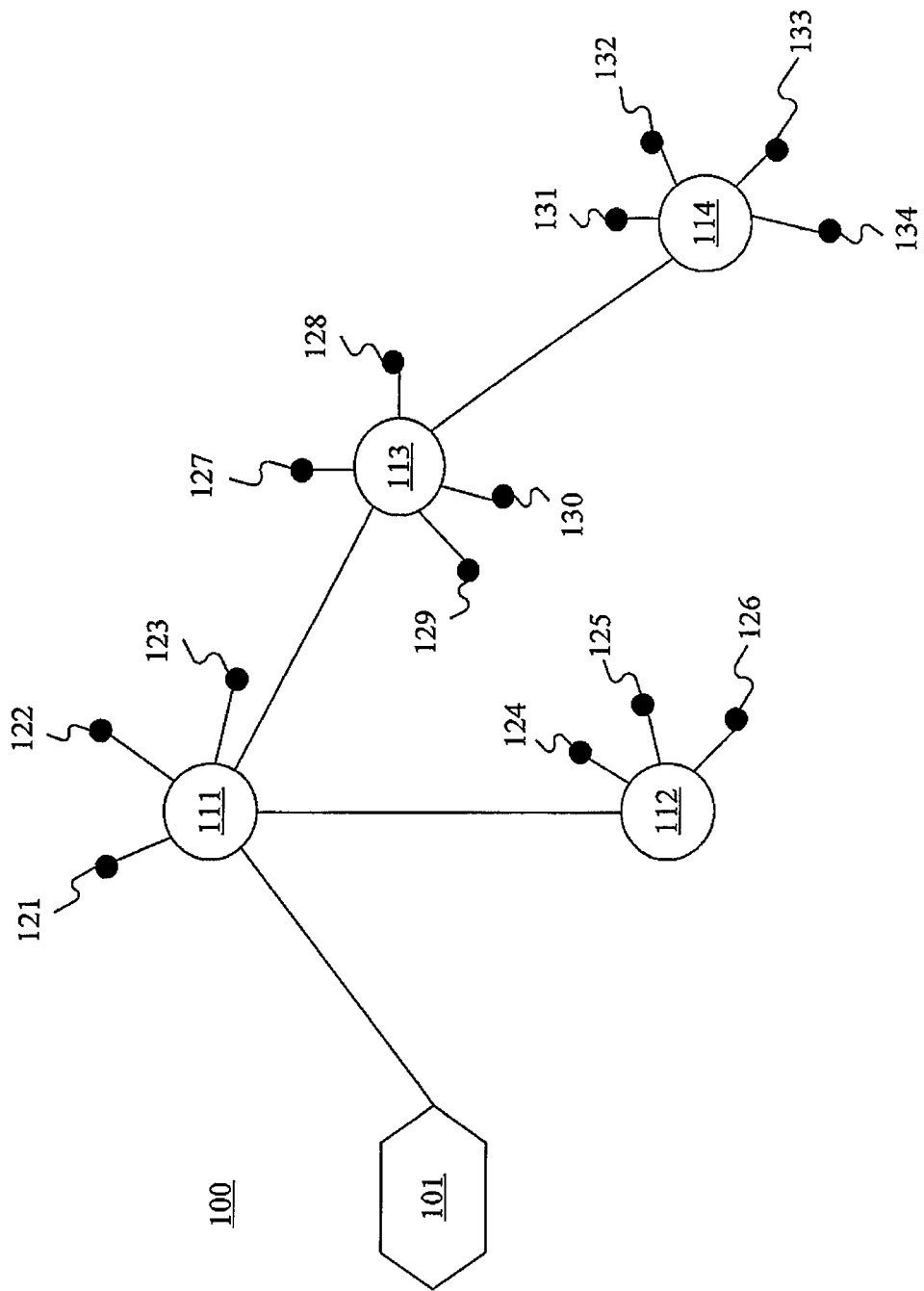
FIG. 1 shows a wireless sensor network consistent with embodiments of the present invention.

Consistent with embodiments of the present invention, a WSN 100 is shown in FIG. 1. In FIG. 1, there is a sink device 101, four sensor devices 111, 112, 113, and 114, and fourteen tag devices 121, 122, 123, 124, 125, 126, 127, 128, 129, 130, 131, 132, 133, and 134. However, a WSN 100 may include more sink, sensor, and tag devices.

Sink device 101 shares a unique secret key $s_i$ with each tag device, and $s_i$ is saved in both sink device 101 and each tag device. Sink device 101 saves all pairs of $(s_i, ID_i)$ while each tag device saves its own individual secret key $s_i$. $ID_i$ represents a unique identification for each of the tag devices 121-134. The sink device 101 further stores a unique encryption key $K_{sink}$ for encrypting every message leaving sink device 101. The encryption key $K_{sink}$ is only known to the sink device 101.

Each of sensor devices 111-114 has a tag-aware sensor and is able to sense tag devices that are within its sensing range. Each of the sensor devices 111-114 further includes a transceiver to communicate with sink device, tag devices within its sensing range, and other sensor devices. A sensor device may serve as a bridge between a sink device and a tag device. In FIG. 1, tag devices 121-123 are placed within the sensing range of sensor device 111. Tag devices 124-126 are placed within the sensing range of sensor device 112. Tag devices 127-130 are placed within the sensing range of sensor device 113. Tag devices 131-134 are placed within the sensing range of sensor device 114. Sink device 101 may send a message to a tag device, for example, to tag device 121 through sensor device 111. Sink device 101 may also send a message to a remote tag device like tag device 133 through sensor devices 111, 113, and 114. In such a WSN, each tag device of interest can be traced by the sink device 101 even if a tag device is located far away from sink device 101.

Tag devices 121-134 may be small, thin, readable, and writable devices. Each of the tag devices 121-134 includes a small memory for storing information regarding a target to which the tag device is tagged. Each of the tag devices 121-134 may have computational capability weaker than the sink device 101. Due to the limited computational capability, tag devices 121-134 may not be able to perform operations such as encryption or decryption.

The characteristics of sink device, sensor device, and tag devices described above will be applied throughout the following embodiments.

When a tag device receives a query from a WSN, the tag device first verifies the source of the query to know if the query is coming from a trusted sink device or from an unauthorized attacker. A tag device may perform an authentication process to decide whether to reply to the query.

Consistent with embodiments of the present invention, an authentication method in a WSN is depicted as follows. Sink node 101 generates a private key and a public key. The private key and public key are both stored in the sink device 101 after being generated. The sink device 101 transmits the public key to tag devices 121-134 through sensor devices 111-114.

The private key includes t sub-private keys which are generated by a pseudorandom generator in sink device 101. A length of each sub-private key is l bits. The sub-private keys are used to generate the public key.

A conventional method to generate the public key is to perform a one-way hash function on each of the t sub-private keys. The t sub-private keys are converted to t hash values. These t hash values are regarded as t sub-public keys forming the private key. The public key including the t sub-private keys is transmitted to tag devices 121-134 in the WSN 100 and is stored in each tag device.

Figure 2A:
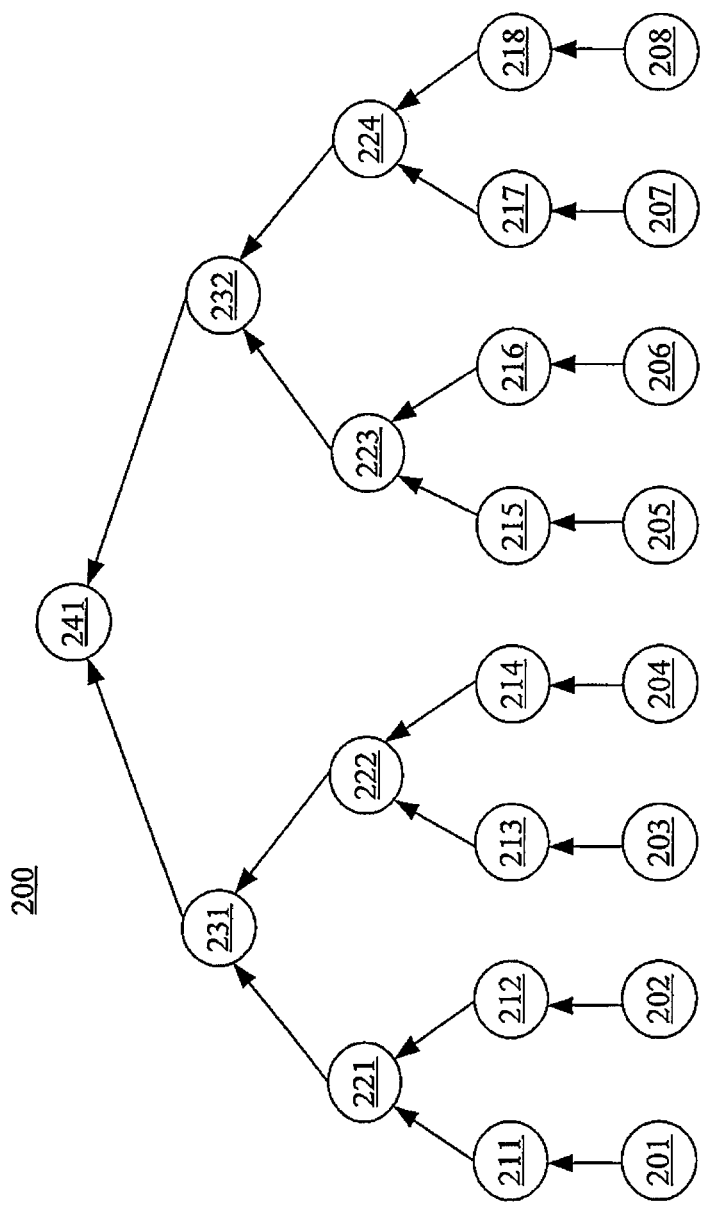
FIG. 2(a) shows a hash tree consistent with embodiments of the present invention.

Consistent with embodiments of the present invention, a hash tree is employed to generate the public key. For example, a hash tree 200 for generating a public key from sub-private keys is illustrated in FIG. 2. In FIG. 2, sub-private keys 201, 202, 203, 204, 205, 206, 207, and 208 are generated by a pseudorandom generator in sink device 100. The quantity of sub-private keys t is equal to 8. Sub-private keys 201-208 are employed to construct the hash tree 200. In a stage, sub-private keys 201-208 are then converted into hash values 211, 21, 213, 214, 215, 216, 217, and 218, respectively, by a one-way hash function. Hash values 211-218 form leaf nodes of hash tree 200. Nodes above the leaf nodes 211-218 in the hash tree 200 are hashes of their respective children. For example, an intermediate node 221 is the parent node of child nodes 211 and 212. A relationship between parent node 221, and child nodes 211 and 212 may be expressed as:

Node 221=Hash(Node 211|Node 221).

A general expression of relationship between a parent node and two child nodes can be shown as Parent=Hash (child$_{left}$|child$_{right}$).

The hash tree 200 may be constructed through such hashing process to further generate intermediate nodes 222, 223, 224, 231, 232, and a root node 241. The root node 241 is selected as the public key. After the generation of the public key, sink device 101 may send the public key to all of the tag devices 121-134. Each of the tag devices 121-134 saves the public key.

In a conventional public key generation scheme, nodes 211-218 would be selected as public keys. It is clear that a tag device storing a public key including nodes 211-218 would need more storage space than storing a public key including only root node 241.

Consistent with embodiments of the present invention, a sink device may further generate a signature along with a message that would be transmitted to a tag device. A tag device may use the signature to authenticate the source of the message. Based on the result of authentication, a tag device then decides to accept or disregard the received message.

An exemplary generation of a signature will be described below. A message M is intended to be sent from sink device 101 to tag device 121 through sensor device 111. Message M play a role in the method to generate a signature. In a stage, message M is converted into a hash value h by a hash function as follows:

h=Hash(M).

Figure 2B:
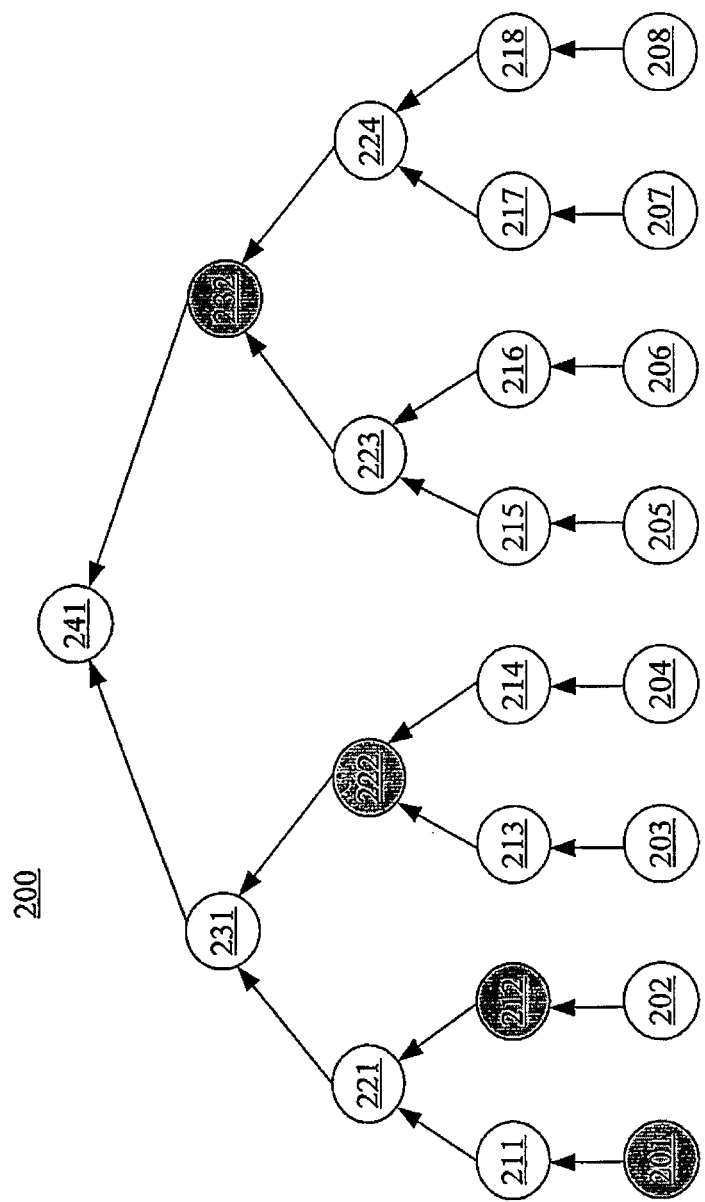
FIG. 2(b) shows a hash tree for a selecting authentication path consistent with embodiments of the present invention.

Here Hash (x) is a hash function. The hash value h is adopted as an index to select a sub-private key. For example, if the hash value h is equal to 0000 in binary system. It is 0 in decimal system. Afterwards, 0 is interpreted as an index to select the first sub-private key 201 in FIG. 2. An authentication path associated with sub-private key 201 includes leaf node 212, intermediate nodes 222 and 232. Nodes 212, 222, and 232 are selected as the authentication path for sub-private key 201. As shown in FIG. 2(b), application of a series of hashing computation starting from sub-private key 201 and its authentication path can generate the root node 241 which is the public key now also stored in all tag devices. {Sub-private key 201, node 212, node 222, node 232} are packed to form the signature for message M.

When a tag device receives the message M and its signature {sub-private key 201, node 212, node 222, node 232}, the tag device constructs a hash tree by use of the signature. The tag device first hashes sub-private key 201 and obtains a hash value: node 211. The tag device further hashes node 211 and node 212 coming from the received signature to obtain node 221. The tag device continues to hash node 221 and node 222 coming from the received signature to obtain node 231. Finally, the tag device hashes node 231 and node 232 coming from the received signature to obtain root node 241. Clearly, if either one of the elements in the signature is incorrect or altered by attackers, the root node of the constructed hash tree would not be the same as node 241. After the construction of the hash tree in the tag device, the tag device compares the obtained root node with the public key previously stored in the tag device. If the obtained root node is equal to the public key, as in this example, the signature is verified and the message M would be accepted by the tag device. On the other hand, if the root node of the constructed hash tree differs from the public key, the signature is not verified and the message would be discarded by the tag device.

In such an authentication scheme, only low computation, such as hashing computation, is involved in a tag device to verify a signature. Therefore, light weight authentication can be achieved in a WSN.

Figure 3A:
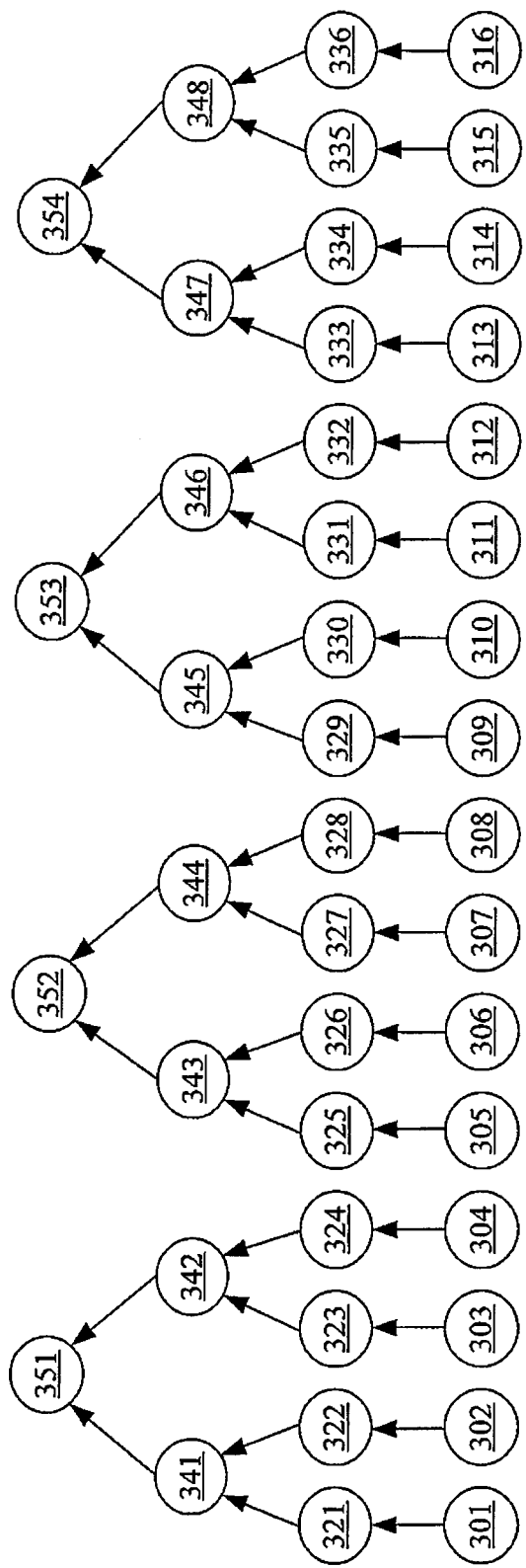
FIG. 3(a) shows another hash tree consistent with embodiments of the present invention.

Consistent with embodiments of the present invention, another light weight authentication scheme will be described as follows. In a public key generation process, a plurality of hash trees, instead of one hash tree, may be constructed from a plurality of sub-private keys. An example is illustrated in FIG. 3(a). A private key including 16 sub-private keys 301, 302, 303, 304, 305, 306, 307, 308, 309, 310, 311, 312, 313, 314, 315, and 316 is generated by a pseudorandom generator in the sink device 100. The sink device 100 hashes the sub-private keys 301-316 to obtain leaf nodes 321, 322, 323, 324, 325, 326, 327, 328, 329, 330, 332, 332, 333, 334, 335, and 336 of the hash trees as shown in FIG. 3. Nodes 321-324 are grouped to construct a first hash tree. Hashing nodes 321 and 322 generates an intermediate node 341. Hashing nodes 323 and 324 generates an intermediate node 342. Hashing intermediate nodes 341 and 342 generates a root node 351 of the first hash tree. Similarly, nodes 325-328 are grouped to construct a second hash tree. The second hash tree further includes two intermediate nodes 343 and 344, and a root node 352. Nodes 329-332 are grouped to construct a third hash tree. The third hash tree further includes two intermediate nodes 345 and 346, and a root node 353. Nodes 333-336 are grouped to construct a fourth hash tree. The fourth hash tree further includes two intermediate nodes 347 and 348, and a root node 354. Each of the root nodes 351-354 are selected as sub-public keys forming the public key.

If the number of sub-private keys is t and the number of hash trees is d, a height of each hash tree is equal to ln t−ln d. As illustrated in FIG. 3, when the sub-private key number is 16 and the hash tree number is 4, the height of each hash tree is 2 (=ln 16−ln 4).

After the generation of private key including sub-private keys 301-316 and public key including sub-public keys 351-354, both the private and the public keys are stored in sink device 101. The public key is transmitted to all tag devices 121-134 through sensor devices 111-114. Each of the tag devices 121-134 saves the public key.

When a message M' is intended to be sent from sink device 101 to a tag device, for example, to tag device 121 through sensor device 111, message M' is used to generate a signature. In a stage, M' is converted into a hash value h' by a hash function as follows:

$$h'=\text{Hash}(M').$$

Figure 3B:
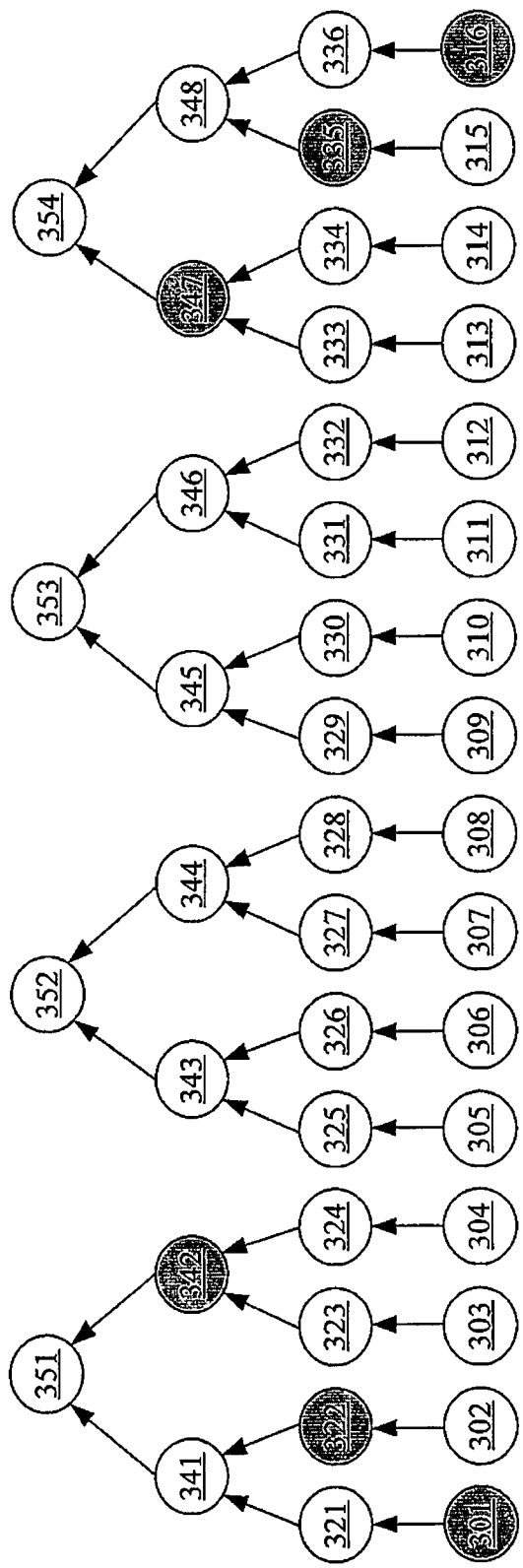
FIG. 3(b) shows a hash tree for selecting authentication paths consistent with embodiments of the present invention.

The hash value h' is utilized as an index to select one or more sub-private keys. For selecting multiple sub-private keys, the hash value h' may be split into multiple pieces with each piece having a data length L. For example, if the hash value h' is 11110000 in binary system. It may be split into two pieces: 1111 and 0000. 1111 and 0000 are 15 and 0 in decimal system, respectively. Afterwards, 0 is interpreted as to select the first sub-private key 301, and 15 is interpreted as to select the 16th sub-private key 316 in FIG. 3(a). As shown in FIG. 3(b), an authentication path associated with sub-private key 301 includes leaf node 322 and intermediate node 342. Nodes 322 and 342 are selected as the authentication path for sub-private key 301. Similarly, an authentication path associated with sub-private key 316 includes leaf node 335 and intermediate node 347. Nodes 335 and 347 are selected as the authentication path for sub-private key 316. As shown in FIG. 3(b), application of a series of hashing computation starting from sub-private keys 301 and 316 and their authentication paths can generate the root node 351 in the first hash tree and root node 354 in the fourth hash tree, respectively. Root nodes 351 and 354 are included in the public key now stored in all tag devices. {Sub-private key 301, node 322, node 342} and {sub-private key 316, node 335, node 347} are packed to form the signature for message M'.

When a tag device receives the message M' and its signature {sub-private key 301, node 322, node 342} and {sub-private key 316, node 335, node 347}, the tag device verifies the signature to decide whether to accept the message M'. In a stage, the tag device picks sub-private keys by employing the received message M'. The tag device hashes the message M' according to h' =Hash (M'). The tag device may split hash value h' into multiple pieces (h'$_1$, h'$_2$, ..., h'$_n$) with each piece also having a data length L. This process insures that a tag device correctly selects sub-public keys for authentication. For selecting a sub-public key, each piece h'n is divided by (t/d), wherein t is the number of sub-private keys and d is the number of hash trees generated during the construction of sub-public keys in the sink device. For example, h' is 11110000 in binary system and is split into two pieces: 1111 and 0000. 1111 and 0000 are 15 and 0 in decimal system. In this example, t is equal to 16 while d is equal to 4. Therefore t/d equals 4. 15 divided by 4 equals 3 when remainder is neglected. 0 divided by 4 equals 0. The results, 0 and 3, are used to select sub-public keys. 0 may be interpreted as to select the first sub-public key 351, and 3 may be interpreted as to select the fourth sub-public key 354.

In another stage, the tag device adopts the signature {sub-private key 301, node 322, node 342} and {sub-private key 316, node 335, node 347} to re-construct hash trees. The tag device hashes sub-private key 301 to obtain a node 321. The tag device further hashes node 321 and node 322 coming from the signature to obtain node 341. Tag device continues to hash node 341 and node 342 coming from the signature to obtain root node 351. Note that nodes 321, 341, and 351 are obtained by computation in the tag device. Similarly, the tag device hashes sub-private key 316 to obtain a node 336. The tag device further hashes node 336 and node 335 coming from the signature to obtain node 348. The tag device then hashes node 348 and node 347 coming from the signature to obtain root node 354. Also note that nodes 336, 348, and 354 are obtained by computation. Clearly, if either one of the elements in the signature is incorrect or altered by attackers, the root nodes of the constructed hash trees would not be the same as nodes 351 and 354.

The root nodes obtained by computation are used for comparison with the selected sub-public keys. If the root nodes are equal to the selected sub-public keys, as in this example, the signature is verified and the message M' would be accepted by the tag device. If the root nodes differ from the selected sub-public keys, the signature is not verified and the message would be discarded by the tag device.

In such an authentication scheme, only low computation, such as hashing computation, is involved in a tag device to verify a signature. Therefore, light weight authentication can be achieved in a WSN.

Figure 4:
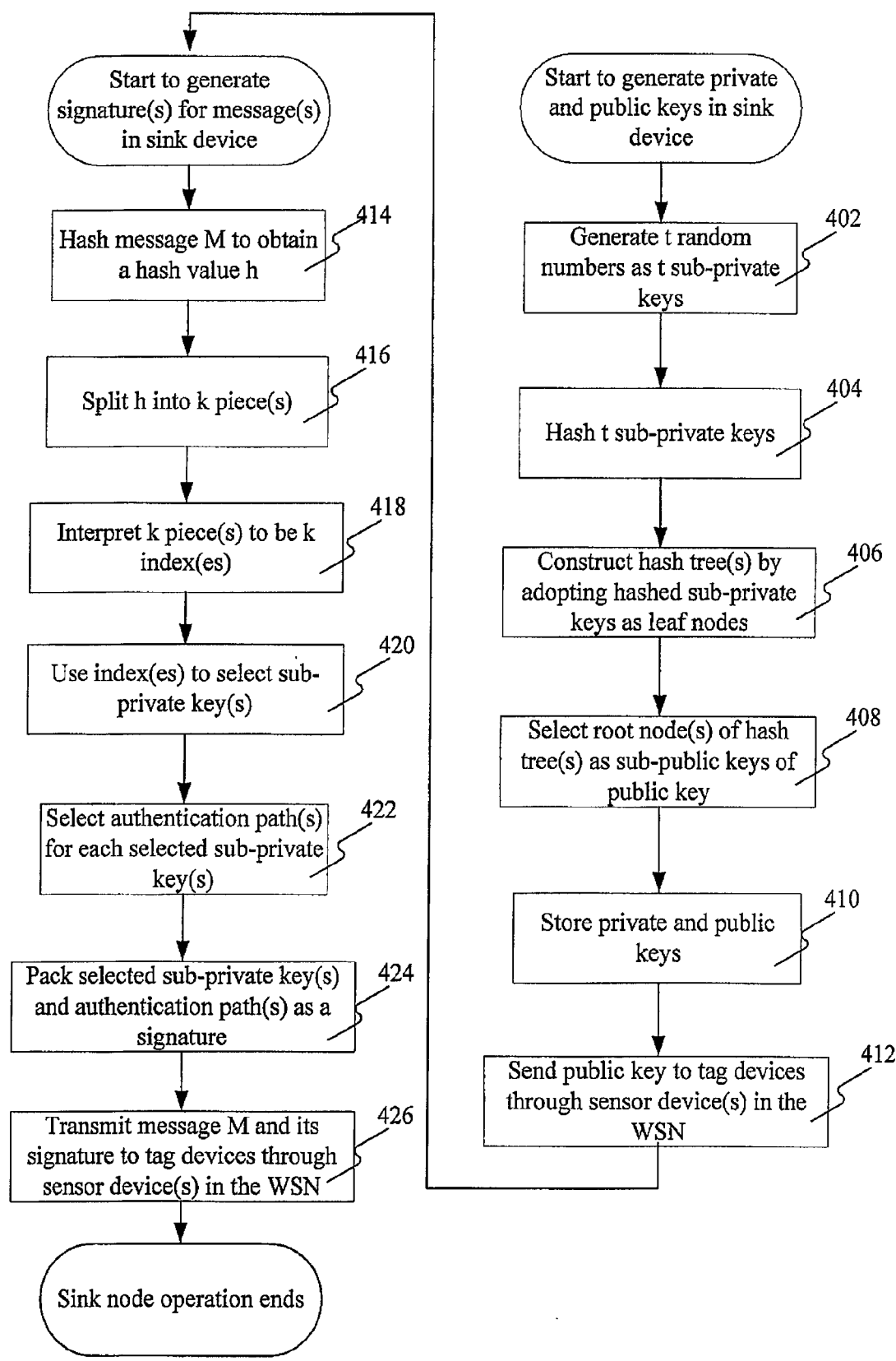
FIG. 4 shows a flow chart of sink device procedures consistent with embodiments of the present invention.

Consistent with embodiments of the present invention, a flow chart to illustrate operation within a sink device is shown in FIG. 4. A pseudorandom generator of the sink device generates t random numbers (stage 402). These t random numbers are selected as sub-private keys in a private key. The sub-private keys are hashed (stage 404). The hashed sub-private keys are used as leaf nodes to construct one or more hash trees (stage 406). Each hash tree includes a plurality of leaf nodes and a root node, and may include one or more intermediate nodes. The root nodes of hash trees are selected as sub-public keys in a public key (stage 408). A public key may include one or more sub-public keys. The sink node stores the private and public keys (stage 410). The sink device sends the public key to tag devices through sensor devices in a WSN (stage 412). The position of stages 410 and 412 in the flow chart is interchangeable. In other words, the sink device may send public key to tag devices before saving the private and public keys.

When there is a message M to be transmitted to tag devices in the WSN, the sink device generates a signature for the message M to sign the message M. The sink device hashes the message M to obtain a hash value h (stage 414). The sink device splits h into k piece(s) (stage 416). The sink device interprets the k piece(s) into k index(es) (stage 418) to select k sub-private key(s) (stage 420). The sink device selects authentication path for each selected sub-private key (stage 422). The sink device packs the selected sub-private key(s) and the authentication path(s) to form the signature for the message M (stage 424). The sink device sends the message M and the signature to tag device(s) through sensor device(s) in the WSN (stage 426).

Figure 5:
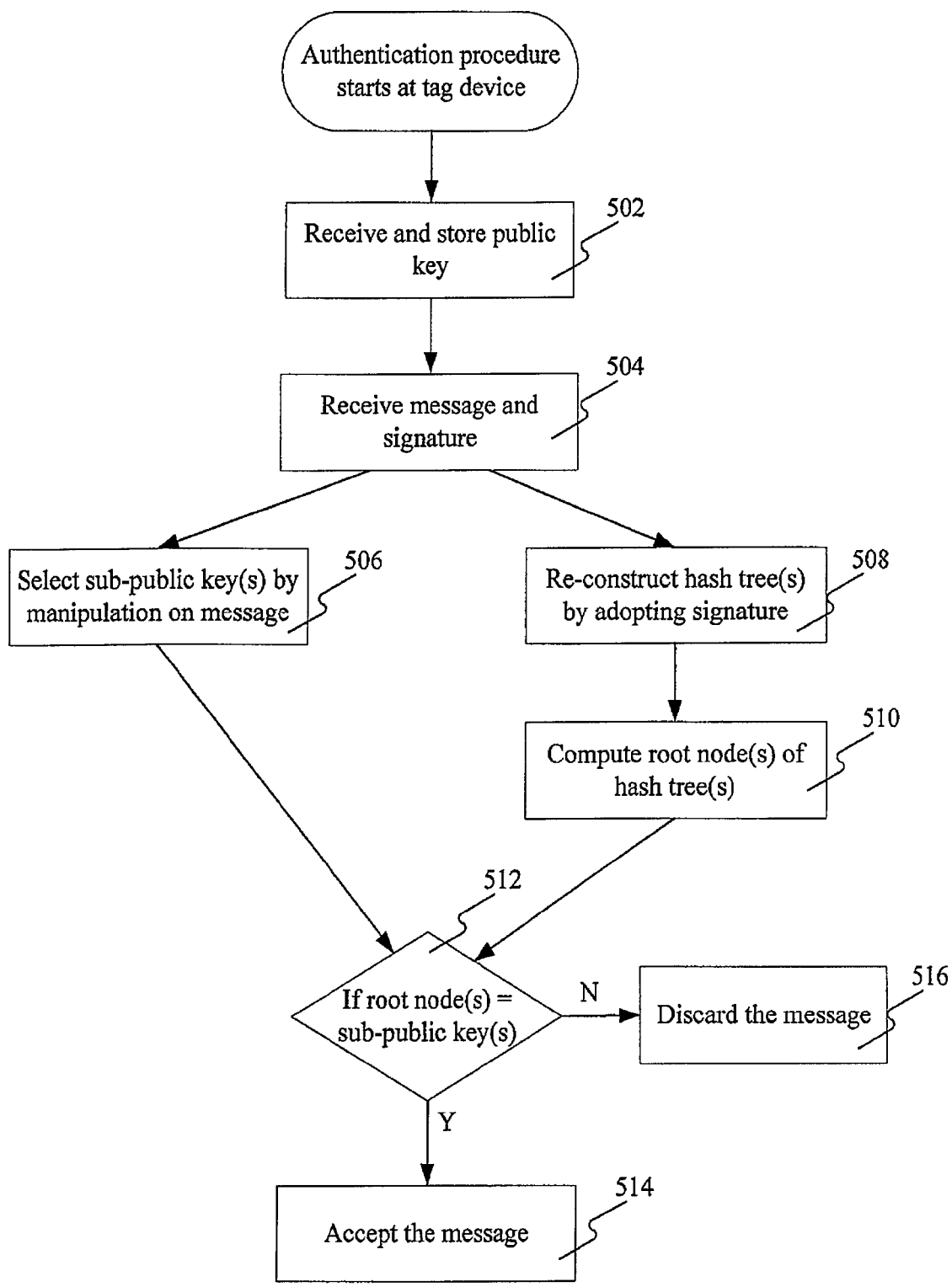
FIG. 5 shows a flow chart of tag device procedures consistent with embodiments of the present invention.

The procedures in a tag device to verify a signature is illustrated in FIG. 5. The tag device receives and stores the public key coming from the sink device (stage 502). The tag device further receives a message and a signature (stage 504). The tag device manipulates the message to select sub-public key(s) previously stored at stage 502 (stage 506). In parallel, the tag device reconstructs hash tree(s) by adopting the received signature (stage 508). The tag device computes root node(s) of the hash tree(s) (stage 510). The tag device compares the root node(s) with the selected sub-public key(s) (stage 512). If the root node(s) equals the selected sub-public key(s), the tag device accepts the message (stage 514). If the root node(s) does not equal the selected sub-public key(s), it means the message does not come from a trusted sink device. The tag device discards the message (stage 516).

Figure 6:
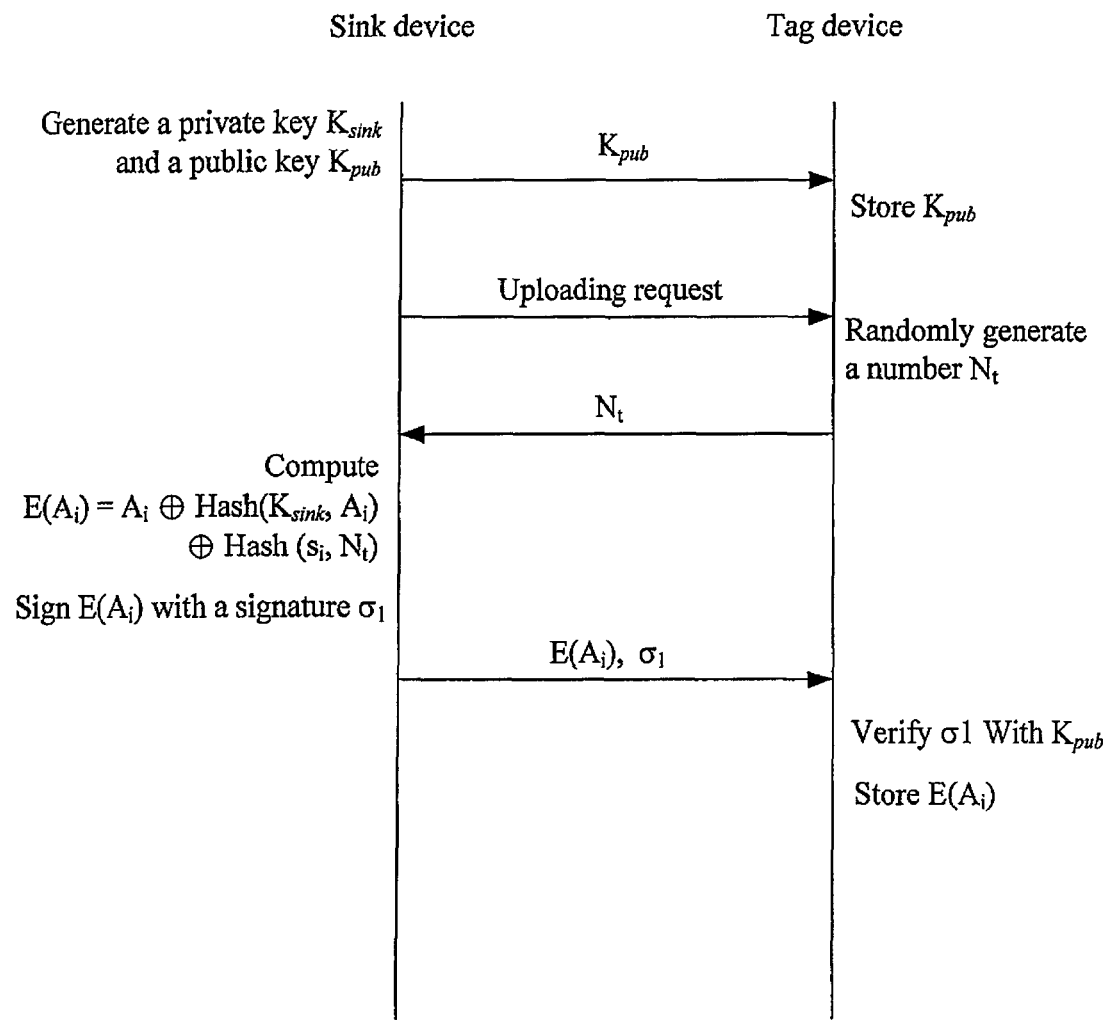
FIG. 6 shows operation procedures in a sensor network consistent with embodiments of the present invention.

Consistent with embodiments of the present invention, a light-weight signature authentication method may be employed to store secret messages in a tag device in a WSN. An example is shown in FIG. 6. A sink device generates a private key $K_{sink}$ and a public key $K_{pub}$ as described in FIGS. 2-4 and their relevant descriptions (stages 402-408). The public key $K_{pub}$ is transmitted from the sink device to a tag device through one or more sensor devices (stage 412). The tag device then stores the public key $K_{pub}$ (stage 502). Before sending a raw message $A_i$ to the tag device, the sink device sends out an uploading request to the tag node. The tag node then randomly generates a number $N_r$ and sends $N_r$ to the sink device. Next, the sink device encrypts the raw message $A_i$. The sink device hashes private key $K_{sink}$ and the raw message $A_i$ to be a first hash value. The sink device may only hash the raw message $A_i$ to be the first hash value. The sink device further hashes $N_r$ and $s_i$ to be a second hash value. $s_i$ is a unique secret shared between the sink device and the tag device. The sink device may only hash $s_i$ to be the second hash value. The sink device encrypts the raw message $A_i$ by an operation of exclusive disjunction over the raw message $A_i$, the first hash value, and the second hash value. The encrypted raw message $E(A_i)$ can be express as follows:

$$E(A_i) = A_i \oplus \text{Hash}(K_{sink}, A_i) \oplus \text{Hash}(s_i, N_r).$$

The sink device then signs $E(A_i)$ with a signature $\sigma_1$. Methods to generate signature σ1 are shown in FIGS. 2-4 and their relevant descriptions (stages 414-424). The sink sends the encrypted message $E(A_i)$ and its signature $\sigma_1$ to the tag device (stage 426).

Upon receiving the encrypted message $E(A_i)$ and its signature $\sigma_1$, the tag device first checks up the signature to learn whether the message is coming from a trusted sink device. Methods to verify a signature are depicted in FIG. 5 and its relevant descriptions above. If the signature is verified by the tag device, the tag device saves the encrypted message $E(A_i)$ accordingly.

Figure 7:
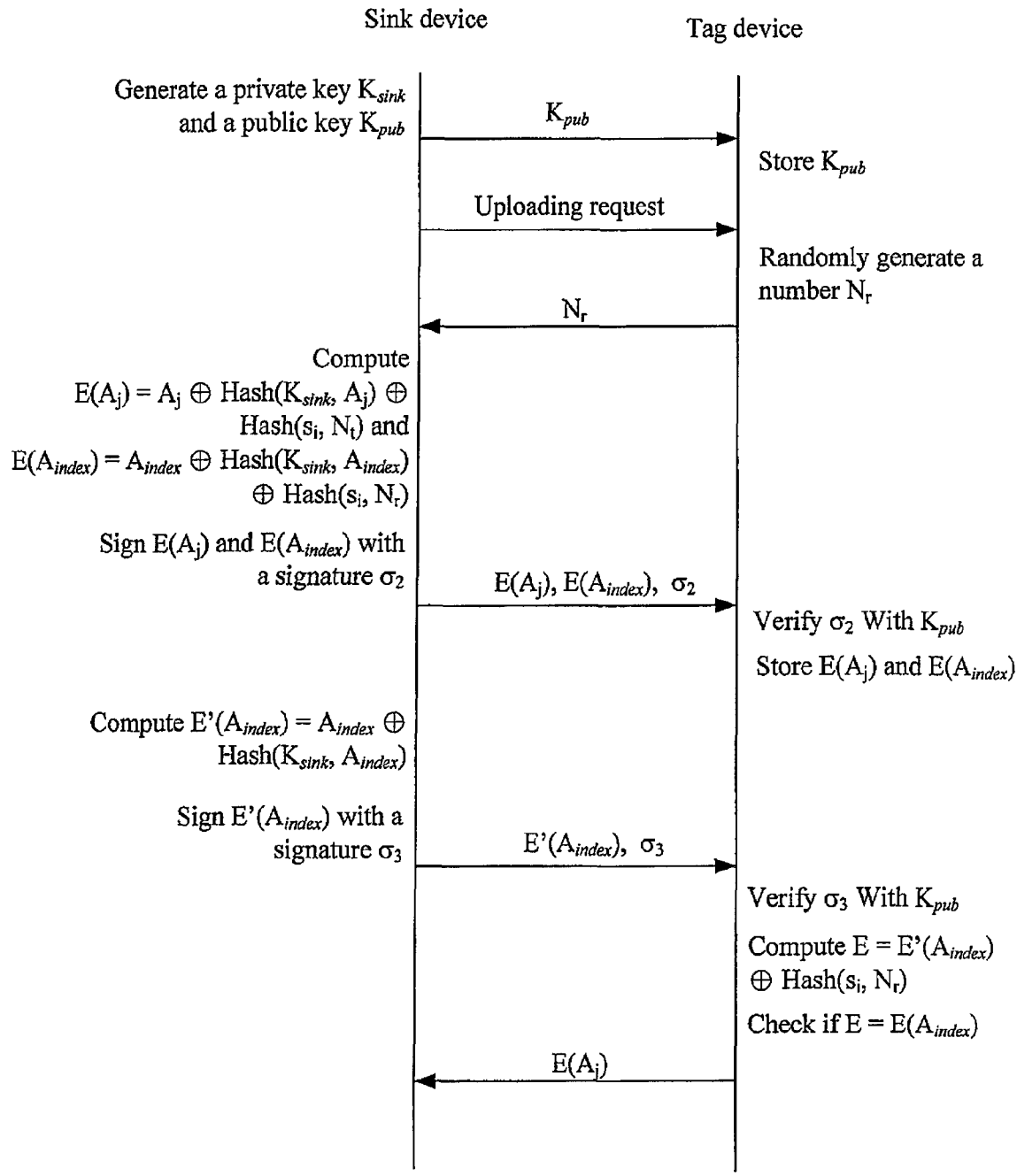
FIG. 7 shows another operation procedures in a sensor network consistent with embodiments of the present invention.

Since tag devices are computationally weak and unable to perform computations such as decryption or encryption, the present invention further provides a data retrieval scheme while the data is in encrypted condition. Consistent with embodiments of the present invention, a data retrieval method is shown in FIG. 7. A sink device generates a private key $K_{sink}$ and a public key $K_{pub}$. Methods to generate private key $K_{sink}$ and public key $K_{pub}$ are described in FIGS. 2-4 and their relevant descriptions (stages 402-408). The public key $K_{pub}$ is transmitted from the sink device to the tag device through one or more sensor devices (stage 412). The tag device then stores the public key $K_{pub}$ (stage 502). Upon sending over messages to the tag device, the sink device sends out an uploading request to the tag node. The tag node then randomly generates a number $N_r$ and sends $N_r$ to the sink device. Next, the sink device encrypts a raw message $A_j$ and an index message $A_{index}$ which is associated with the raw message $A_j$. An index message may be associated with a single raw message or a plurality of raw messages.

The sink device hashes private key $K_{sink}$ and the raw message $A_j$ to be a first hash value. The sink device may only hash the raw message $A_j$ to be a first hash value. The sink device further hashes number $N_r$ and $s_i$ to be a second hash value. Or the sink device may only hash $s_i$ to be a second hash value. The sink device encrypts the raw message $A_j$ by an operation of exclusive disjunction over the raw message $A_j$, the first hash value, and the second hash value. The encrypted raw message $E(A_j)$ can be express as follows:

$$E(A_j) = A_j \oplus \text{Hash}(K_{sink}, A_j) \oplus \text{Hash}(s_i, N_r).$$

Similarly, the index message $A_{index}$ may be encrypted by the same method employed to encrypt the raw message $A_j$. The encrypted index message $E(A_{index})$ can be express as follows:

$$E(A_{index}) = A_{index} \oplus \text{Hash}(K_{sink}, A_{index}) \oplus \text{Hash}(s_i, N_r).$$

After encrypting $A_j$ and $A_{index}$, the sink device further generates a signature for each of the encrypted messages $E(A_j)$ and $E(A_{index})$ or for both of the encrypted messages $E(A_j)$ and $E(A_{index})$. FIG. 7 illustrates that sink device generates a signature $\sigma_2$ for both of messages $E(A_j)$ and $E(A_{index})$. Methods to generate signature $\sigma_2$ are depicted in FIGS. 2-4 and their relevant descriptions (stages 414-424). The sink device sends the encrypted messages $E(A_j)$ and $E(A_{index})$, and their signature $\sigma_2$ to the tag device (stage 426).

After receiving the encrypted message $E(A_j)$ and $E(A_{index})$, and their signature $\sigma_2$, the tag device first checks up the signature to learn whether the messages are coming from a trusted sink device. Methods to verify a signature are depicted in FIG. 5 and its relevant descriptions. If the signature is verified by the tag device, the tag device saves the encrypted messages $E(A_j)$ and $E(A_{index})$ accordingly.

When the sink device would like to retrieve the encrypted message $E(A_j)$ from a tag device, the sink device uses $A_{index}$ for searching. The sink device encrypts $A_{index}$ by following computation:

$$E'(A_{index}) = A_{index} \oplus \text{Hash}(K_{sink}, A_{index}).$$

The sink device further generates a signature $\sigma_3$ for $E'(A_{index})$. The sink device then sends $E'(A_{index})$ and its signature $\sigma_3$ to all of the tag devices in the WSN.

Upon receiving the encrypted message $E'(A_{index})$ and its signature $\sigma_3$, a tag device checks up the signature $\sigma_3$ to learn whether the messages are coming from a trusted sink device. A method to verify a signature is depicted in FIG. 5 and its relevant descriptions. If the signature is verified by a tag device, the tag node then computes:

$$E = E'(A_{index}) \oplus \text{Hash}(s_i, N_r).$$

Note that only the targeted tag knows the unique secret $s_i$. Therefore, when checking whether $E = E(A_{index})$, only the targeted tag could make the equation tenable. All other tag devices will have $E \neq E(A_{index})$. The targeted tag device sends back $E(A_j)$ to the sink device if $E = E(A_{index})$. In case the index message $A_{index}$ associates with a plurality of raw messages, the targeted tag device may send all the encrypted raw messages back.

Accordingly, messages transmitted over a WSN are in an encrypted condition, a non-targeted receiver or an authorized attacker would not able to read the messages. Further, a tag device does not need a high computation capability to deal with searching over the encrypted data.

Figure 8A:
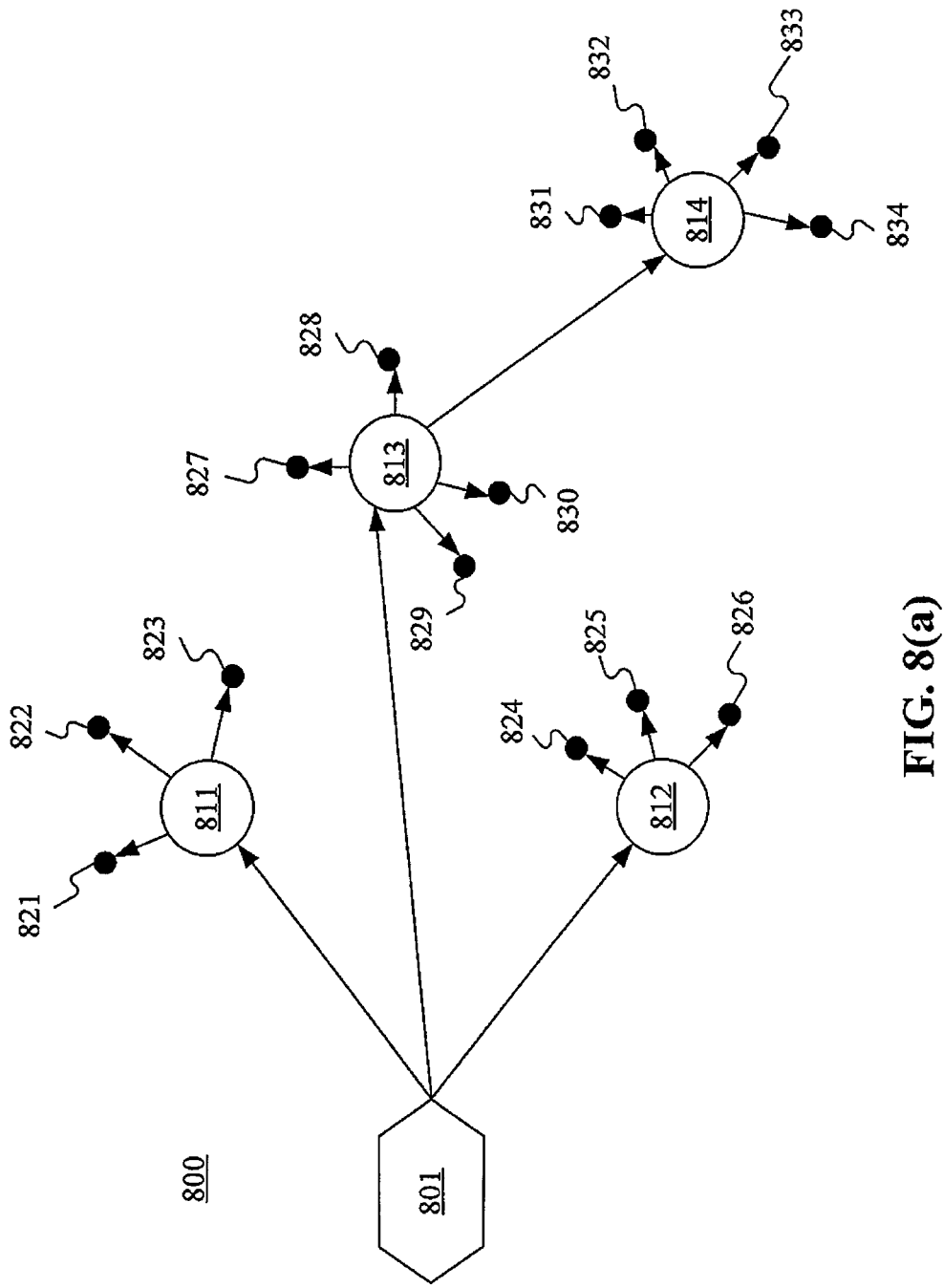
FIG. 8(a) shows a wireless sensor network for broadcasting consistent with embodiments of the present invention.
Figure 8B:
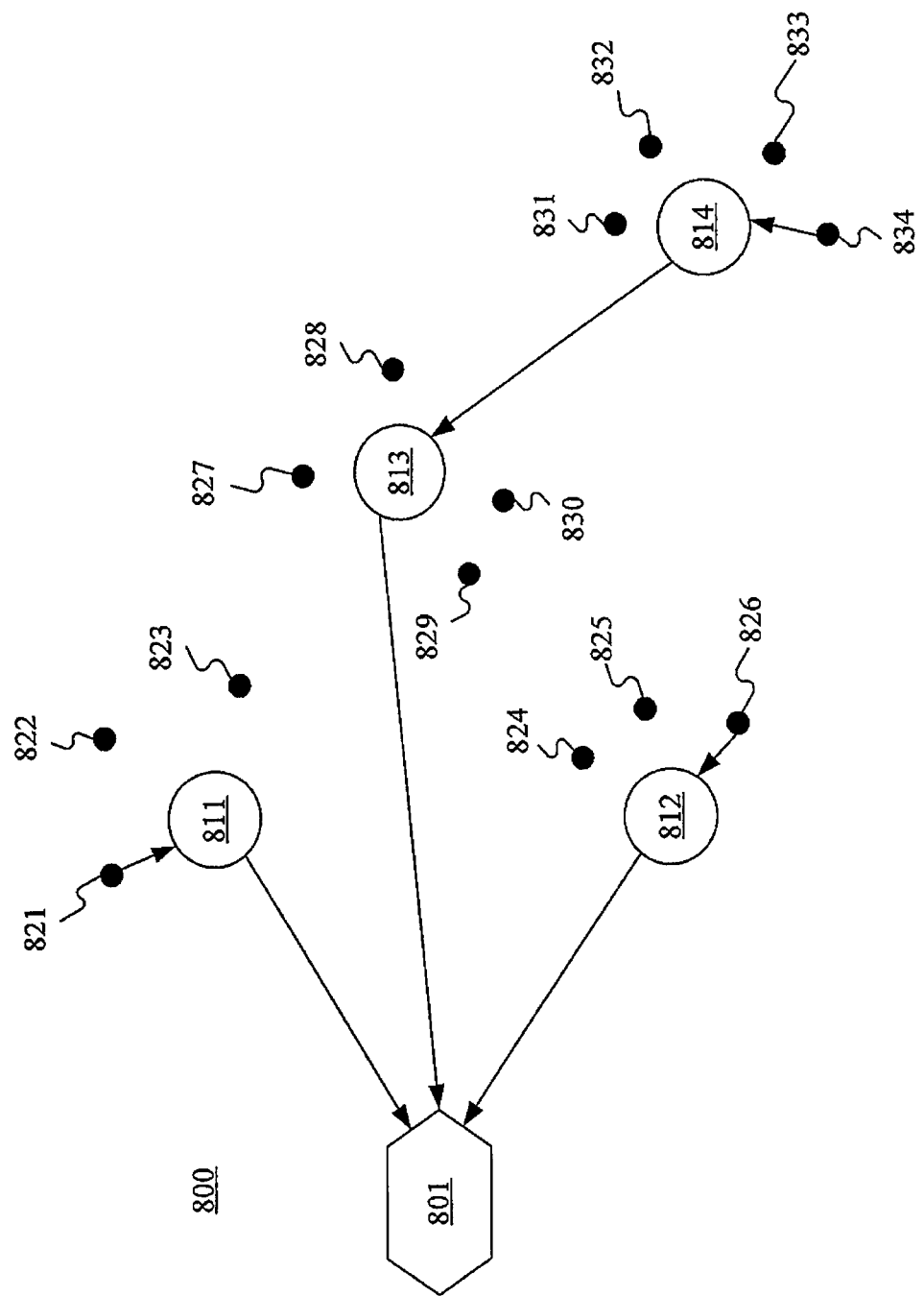
FIG. 8(b) shows a wireless sensor network for message retrieving consistent with embodiments of the present invention.
Figure 9:
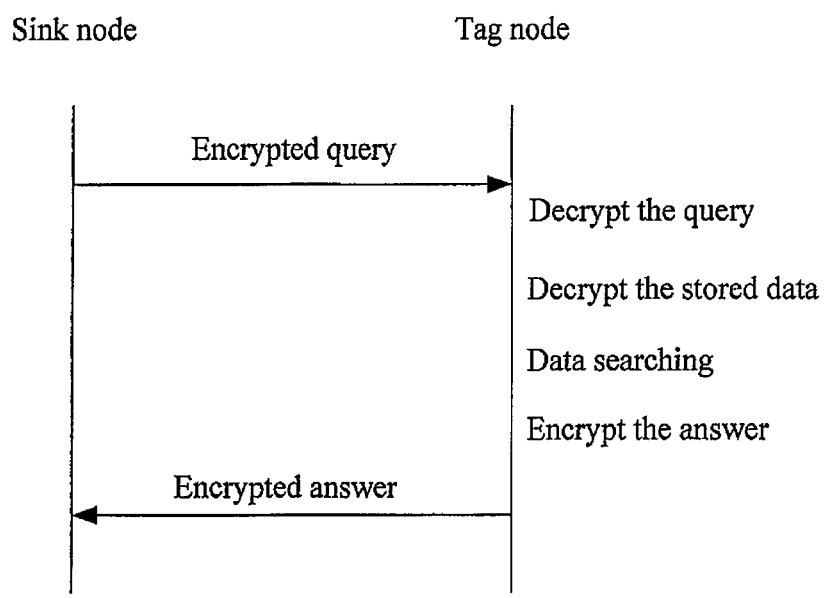
FIG. 9 shows prior art network procedures.

Consistent with embodiments of the present invention, a data retrieval scheme is illustrated in FIGS. 8(a) and 8(b). FIG. 8 (a) depicts a query transmission scheme. A WSN 800 includes a sink device 801, four sensor devices 811, 812, 813, and 814, and fourteen tag devices 821, 822, 823, 824, 825,

826, 827, 828, 829, 830, 831, 832, 833, and 834. Tag devices 821-823 are within the sensing range of sensor device 811. Tag devices 824-826 are within the sensing range of sensor device 812. Tag devices 827-830 are within the sensing range of sensor device 813. Tag devices 831-834 are within the sensing range of sensor device 814. When a query is invoked to the sink device 801, the sink device broadcasts the query into the WSN 800. The sink device further generates a signature for the query. Every tag device within the WSN 800 would receive the query and its signature through the sensor device that senses it. Each of the tag devices 821-834 verifies the query by its signature and decides whether to accept the query. If the query is verified, tags having answers to the query then send the answers to sink device 801. An example of sending answer from tag devices to sink device is shown in FIG. 8(*b*). Tag device 821 sends the answer through sensor device 811. Tag device 826 sends the answer through sensor device 812, and tag device 834 sends the answer through sensors devices 814 and 813.

The present invention may be applicable to all kinds of communication networks. In addition, a tag device may be a radio frequency identification (RFID) device.

It will be apparent to those skilled in the art that various modifications and variations can be made in the disclosed systems, methods and procedures without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for authenticating a message in a network, the method comprising:
    generating, in a sink device, a private key and a public key, wherein the private key comprises a plurality of sub-private keys and the public key comprises a plurality of sub-public keys, the generation of the public key comprising:
        hashing the sub-private keys;
        constructing a plurality of hash trees, the hash trees comprising a plurality of leaf nodes, root nodes, and intermediate nodes between the leaf nodes and the root nodes, wherein the leaf nodes are the hashed sub-private keys; and
        selecting the root nodes of the hash trees as the sub-public keys; and
    generating, in the sink device, a signature for the message, wherein the signature comprises one of the sub-private keys and an authentication path associated with the one of the sub-private keys in a first one of the hash trees, and the generation of the signature comprises:
        hashing the message into a hash value;
        splitting the hash value into k piece(s), wherein one value of the k piece(s) is k1;
        using k1 as an index to select the one of the sub-private keys; and
        using the one of the sub-private keys to select the authentication path.

2. The method of claim 1 further comprising:
    transmitting the public key, the message, and the signature from the sink device to a tag device; and
    verifying, in the tag device, the signature by constructing a first verifying hash tree using the sub-private key and the authentication path.

3. The method of claim 2 further comprising storing, in the tag device, the message if the signature is verified.

4. The method of claim 3, wherein the signature is a first signature and the authentication path is a first authentication path, the method further comprising:
    generating, in the sink device, a search message for searching the message stored in the tag device; and
    generating, in the sink device, a second signature for the search message, wherein the second signature comprises a second one of the sub-private keys and a second authentication path associated with the second one of the sub-private keys in a second one of the hash trees.

5. The method of claim 4, further comprising:
    transmitting the search message and the second signature from the sink device to the tag device; and
    verifying, in the tag device, the second signature by constructing a second verifying hash tree using the second one of the sub-private keys and the second authentication path.

6. In an authentication system, a method for a tag device to verify a message from a sink device, wherein the sink device has a computation capability greater than the tag device, the method comprising:
    generating, in the sink device, a private key and a public key, wherein the private key comprises a plurality of sub-private keys and the public key comprises a plurality of sub-public keys;
    storing, in the sink device, the private key;
    generating, in the sink device, a signature for the message, wherein the signature comprises one of the sub-private keys and an authentication path associated with the one of the sub-private keys in a hash tree, the hash tree being constructed during the generation of the sub-public keys, and wherein the generation of the signature comprises:
        hashing the message into a hash value;
        splitting the hash value into k piece(s), wherein one value of the k piece(s) is k1;
        using k1 as an index to select the one of the sub-private keys; and
        using the one of the sub-private keys to select the authentication path; and
    transmitting the public key, the message, and the signature from the sink device to the tag device,
        wherein the generation of the public key comprises:
            hashing the sub-private keys;
            constructing a plurality of hash trees, the hash trees comprises a plurality of leaf nodes, root nodes, and intermediate nodes between the leaf nodes and the root node, wherein the leaf nodes are the hashed sub-private keys; and
            selecting root nodes of the hash trees as the sub-public keys.

7. The method of claim 6, wherein
    the quantity of the sub-private keys is t and the quantity of the hash trees is d,
    wherein a height of each of the hash trees is equal to (ln t−ln d).

8. The method of claim 6, wherein
    the one of the sub-private keys is a first sub-private key, and the authentication path is a first authentication path; and
    wherein the generation of the signature for the message in the sink device further comprising:
        selecting a second sub-private key in a second hash tree; and
        selecting a second authentication path associated with the second sub-private key.

9. The method of claim 6, wherein the hash value is a first hash value, and wherein the verification of the signature in the tag device further comprises:
   generating a second hash value by computing the message;
   splitting the second hash value into m piece(s), wherein one value of the m piece(s) is m1;
   selecting a sub-public key in the public key by using m1 as an index; and
   verifying the sub-public key.

10. A method for uploading a message from a sink device into a tag device, wherein the sink device has a computation capability greater than the tag device, the method comprising:
   generating, in the sink device, a private key, wherein the private key comprises a plurality of sub-private keys;
   hashing the sub-private keys;
   generating a public key by constructing a plurality of hash trees having root nodes, using the hashed sub-private keys as leaf nodes, wherein the root nodes of the hash trees are selected as the sub-public keys that form the public key;
   encrypting the message into an encrypted message;
   generating a signature for the encrypted message in the sink device by:
      hashing the message into a hash value;
      splitting the hash value into k piece(s), wherein one value of the k piece(s) is k1;
      using k1 as an index to select one of the sub-private keys; and
      selecting an authentication path associated with the one of the sub-private keys; and
   transmitting the encrypted message and the signature to the tag device.

11. The method of claim 10, further comprising verifying, in the tag device, the signature; and storing, in the tag device, the message if the signature is verified.

12. The method of claim 10, wherein the selected authentication path in the hash tree does not comprise the root node of the hash tree.

13. The method of claim 10, wherein the encryption of the message further comprises:
   hashing the message to be a first hash value;
   hashing a secret to be a second hash value; and
   computing the message with the first hash value and the second hash value by an operation of exclusive disjunction,
      wherein the secret is shared by the sink device and the tag device.

14. A method for a sink device to search an encrypted message stored in a tag device without decryption of the encrypted message, the sink device having a computation capability greater than the tag device, the method comprising:
   hashing, in the sink device, a message to be a first hash value;
   hashing, in the sink device, a secret to be a second hash value, wherein the secret is shared between the sink device and the tag device;
   hashing, in the sink device, an index message to be a third hash value, wherein the index message is associated with the message;
   encrypting, in the sink device, the message by an operation of exclusive disjunction over the message, the first hash value, and the second hash value, and encrypting the index message by an operation of exclusive disjunction over the index message, the second hash value, and the third hash value;
   generating, in the sink device, a first signature for the encrypted message and the encrypted index message; and
   storing, in the tag device, the encrypted message and the encrypted index message.

15. The method of claim 14, further comprising:
   generating, in the sink device, a search message by an operation of exclusive disjunction over the index message and the third hash value;
   generating, in the sink device, a second signature for the search message;
   transmitting the search message and the second signature to the tag node;
   computing, in the tag device, the search message with the second hash value by an operation of exclusive disjunction to obtain an index verification;
   comparing the index verification with the encrypted index message; and
   transmitting the encrypted message from the tag device to the sink device if the index verification is equal to the encrypted index message.

16. The method of claim 15, further comprising:
   generating, in the sink device, a private key, wherein the private key comprises a plurality of sub-private keys;
   hashing, in the sink device, the sub-private keys;
   generating, in the sink device, a public key by constructing a plurality of hash trees using the hashed sub-private keys as leaf nodes; and
   storing, in the tag device, the public key.

17. The method of claim 16, wherein the second signature comprises a second sub-private key and a second authentication path in a third hash tree, the method further comprising:
   verifying, in the tag device, the second signature by constructing a fourth hash tree with the second sub-private key and the second authentication path to compute a root node of the fourth hash tree, and by comparing the root node of the fourth hash tree with the public key.

18. A system comprising:
   a sink device; and
   a tag device, the sink device comprising:
      a memory for storing instructions and data; and
      a processor coupled to the memory, the processor operable to execute instructions stored in the memory for:
         generating a private key and a public key, wherein the private key comprises a plurality of sub-private keys and the public key comprises a plurality of sub-public keys, the generation of the public key comprising:
            hashing the sub-private keys;
            constructing a plurality of hash trees, the hash trees comprising a plurality of leaf nodes, a root node, and intermediate nodes between the leaf nodes and the root node, wherein the leaf nodes are the hashed sub-private keys; and
            selecting the root nodes of the hash trees as the sub-public keys;
         generating a signature for a message, wherein the signature comprises one of the sub-private keys and an authentication path associated with the one of the sub-private keys in one of the hash trees, and wherein the generation of the signature comprises:
            hashing the message into a hash value:
            splitting the hash value into k piece(s), wherein one value of the k piece(s) is k1;
            using k1 as an index to select the one of the sub-private keys; and using the one of the sub-private keys to select the authentication path; and transmitting the public key, the message and the signature from the sink device to the tag device.

19. The system of claim 18, wherein the memory is a first memory and the processor is a first processor, and wherein the tag device comprises:

a second memory; and a second processor coupled to the second memory, the second processor operable to execute instructions in the second memory for verifying the signature by constructing a verifying hash tree using the sub-private key and the authentication path.

20. A system for uploading a message in a network, the system comprising: a sink device and a tag device, the sink device comprising:

a memory for storing instructions and data; and a processor coupled to the memory, the processor operable to execute instructions stored in the memory for:

generating a private key, wherein the private key comprises a plurality of sub-private keys;

hashing the sub-private keys;

generating a public key by constructing a plurality of hash trees having root nodes, using the hashed sub-private keys as leaf nodes, wherein the root nodes of the hash trees are selected as the sub-public keys constituting the public key;

encrypting the message into an encrypted message;

generating a signature for the encrypted message by:

hashing the message into a hash value;

splitting the hash value into k piece(s), wherein one value of the k piece(s) is k1;

using k1 as an index to select one of the sub-private keys; and selecting an authentication path associated with the one of the sub-private keys; and transmitting the encrypted message and the signature to the tag device.

21. The system of claim 20, wherein the selected authentication path in one of the hash trees does not comprise the root node of the one of the hash trees.

22. A system for searching an encrypted message within a network without decryption of the encrypted message, the system comprising:

a tag device; and a sink device, the sink device comprising:

a first memory for storing instructions and data; and a first processor coupled to the first memory, the first processor operable to execute instructions stored in the first memory for:

hashing a message to be a first hash value;

hashing a secret to be a second hash value, wherein the secret is shared between the sink device and the tag device;

hashing an index message to be a third hash value, wherein the index message is associated with the message;

encrypting the message by an operation of exclusive disjunction over the message, the first hash value, and the second hash value, and encrypting the index message by an operation of exclusive disjunction over the index message, the second hash value, and the third hash value;

generating a first signature for the encrypted message and the encrypted index message;

transmitting the encrypted message, the encrypted index message, and the first signature to the tag device;

generating a search message by an operation of exclusive disjunction over the index message and the third hash value;

generating a second signature for the search message in the sink device; and transmitting the search message and the second signature to the tag node.

23. The system of claim 22, wherein the tag device comprises:

a second memory; and a second processor coupled to the second memory, the second processor operable to execute instructions in the second memory for:

receiving the encrypted message, the encrypted index message, and the first signature;

storing the encrypted message and the encrypted index message in the second memory if the first signature is verified;

receiving the search message and the second signature;

verifying the second signature;

computing the search message and the second hash value to obtain an index verification;

comparing the index verification with the encrypted index message; and transmitting the encrypted message to the sink device if the index verification is equal to the encrypted index message.

* * * * *

UNITED STATES PATENT AND TRADEMARK OFFICE
CERTIFICATE OF CORRECTION

PATENT NO. : 8,595,504 B2
APPLICATION NO. : 12/190238
DATED : November 26, 2013
INVENTOR(S) : Huang et al.

Page 1 of 1

It is certified that error appears in the above-identified patent and that said Letters Patent is hereby corrected as shown below:

In the Claims

Claim 6, column 12, lines 47-48, "the hash trees comprises" should read
--the hash trees comprising--.

Claim 6, column 12, line 50, "root node," should read --root nodes,--.

Claim 8, column 12, line 63, "further comprising:" should read
--further comprises:--.

Claim 9, column 13, line 7, "using ml" should read --using m1--.

Claim 18, column 14, line 63, "hash value:" should read --hash value;--.

Signed and Sealed this
Eighth Day of July, 2014

Michelle K. Lee
*Deputy Director of the United States Patent and Trademark Office*